United States Patent
Lee et al.

(10) Patent No.: US 10,651,880 B1
(45) Date of Patent: May 12, 2020

(54) PORTABLE RADIO WITH EXTERNAL ANTENNA COVER AND LANYARD THROUGH-HOLE FEATURE

(71) Applicant: MOTOROLA SOLUTIONS, INC., Chicago, IL (US)

(72) Inventors: Soon Hin Lee, Penang (MY); Christopher Yong, Seremban (MY); Lanting L Garra, Sunrise, FL (US); Lee Sun Ooi, Kulim (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/587,258

(22) Filed: Sep. 30, 2019

(51) Int. Cl.
*H04B 1/3827* (2015.01)
*H01Q 1/42* (2006.01)
*H04B 1/3888* (2015.01)

(52) U.S. Cl.
CPC .............. *H04B 1/385* (2013.01); *H01Q 1/42* (2013.01); *H04B 1/3888* (2013.01)

(58) Field of Classification Search
CPC ......... H04B 1/385; H04B 1/3888; H01Q 1/42
See application file for complete search history.

(56) References Cited

U.S. PATENT DOCUMENTS

| | | | |
|---|---|---|---|
| 6,810,237 B1 | 10/2004 | McEowen | |
| 9,042,846 B2 | 5/2015 | Kang et al. | |
| 9,774,078 B2 | 9/2017 | Margon et al. | |
| 9,930,956 B2 | 4/2018 | Dannan et al. | |
| 2007/0277352 A1* | 12/2007 | Maron | A45C 3/06 24/298 |
| 2007/0290932 A1* | 12/2007 | Morris | H01Q 1/42 343/702 |
| 2012/0273541 A1* | 11/2012 | Zwach | A45C 11/00 224/615 |

\* cited by examiner

*Primary Examiner* — Nguyen T Vo
(74) *Attorney, Agent, or Firm* — Barbara R. Doutre

(57) ABSTRACT

A ruggedized housing for a portable radio is provided. The housing is formed of a front housing portion, a rear housing portion, and a battery cover. The front housing portion has a top surface with offset tapered edges, without any user interface radio controls. An antenna protective cover having offset tapered edges and a straight vertical side couples to the top surface. The offset tapered edges of the antenna protective cover align with the offset tapered edges of the top surface of the radio. The straight vertical side of the antenna protective cover aligns flush with the side housing of the radio. A lanyard through-hole feature is located and protected by a contoured end of the top surface and is located diagonally opposite a top tip end of the antenna protective cover. The top tip end of the antenna protective cover and the lanyard encasement are sloped in opposite directions.

16 Claims, 10 Drawing Sheets

PORTABLE RADIO WITH EXTERNAL ANTENNA COVER AND LANYARD THROUGH-HOLE FEATURE

FIELD OF THE INVENTION

The present invention relates generally to communication devices and more particularly to the minimization of external controls on a portable communication device.

BACKGROUND

Communication devices, such as portable radios, are utilized in a wide variety of communication environments, such as business, consumer retail, security and the like. Many portable radios utilize a variety of top surface protruding elements, such as control knobs and an external antenna. The protruding elements of such devices may cause discomfort to a user when the device is attached to a belt or worn in a pocket. There is a strong desire to minimize protruding elements on a portable radio and when protruding elements are present, to minimize interference of those elements with the user's body. Robustness which provides protection under drop conditions is also highly desirable.

Accordingly, there is a need for an improved portable radio.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
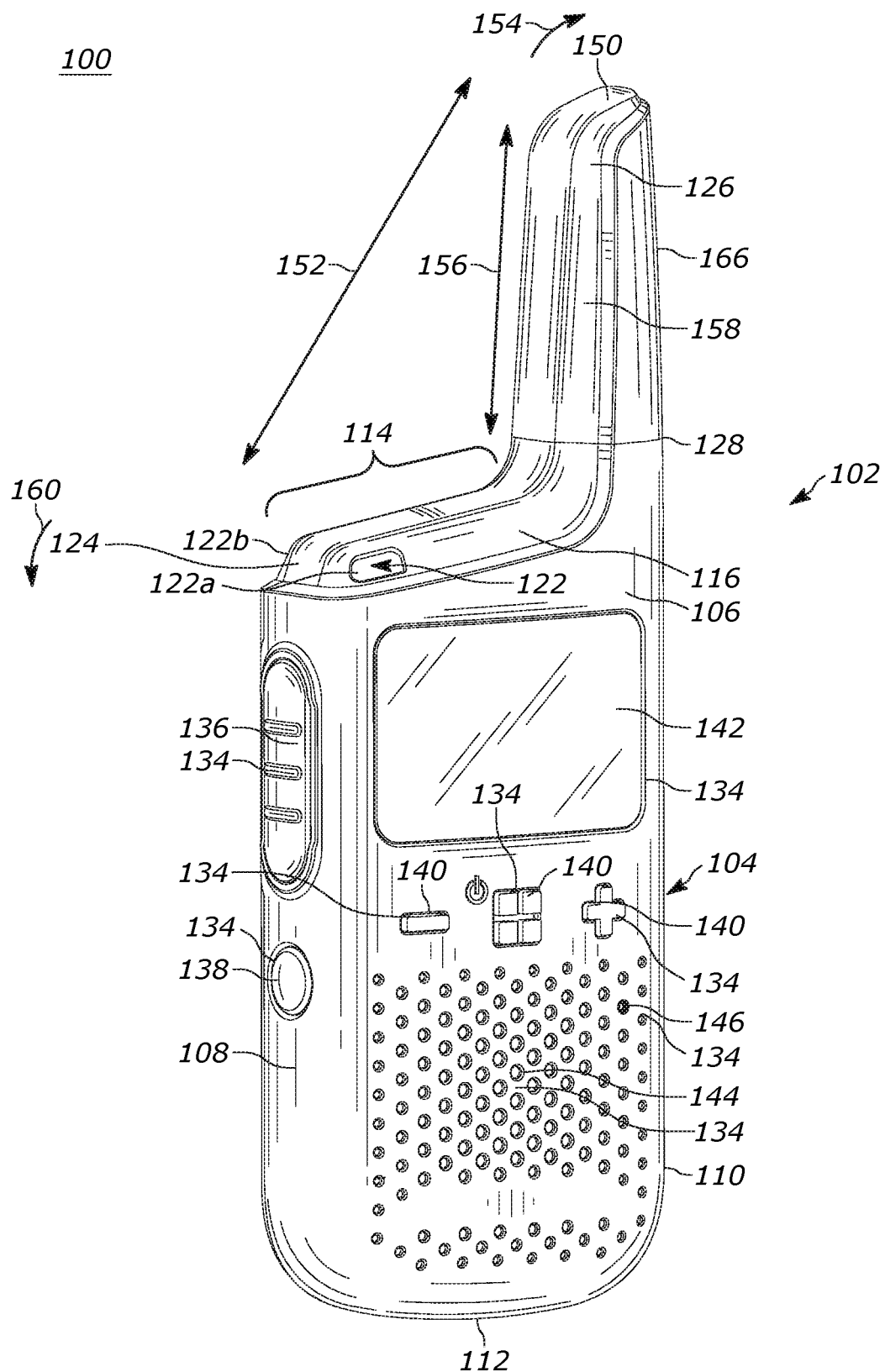
FIG. 1 is a front perspective view of a portable radio formed in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in an improved housing configuration for a portable radio. Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Briefly, there is provided herein a portable radio comprising a housing assembly configured to provide a modular antenna casing and lanyard through-hole feature on a top surface of the radio. Top surface control knobs have been eliminated. The portable radio may be worn in a pocket, on a belt, or tethered via the lanyard through-hole for comfortable user portability without the encumbrance of top surface controls and with improved robustness under drop conditions.

Figure 2:
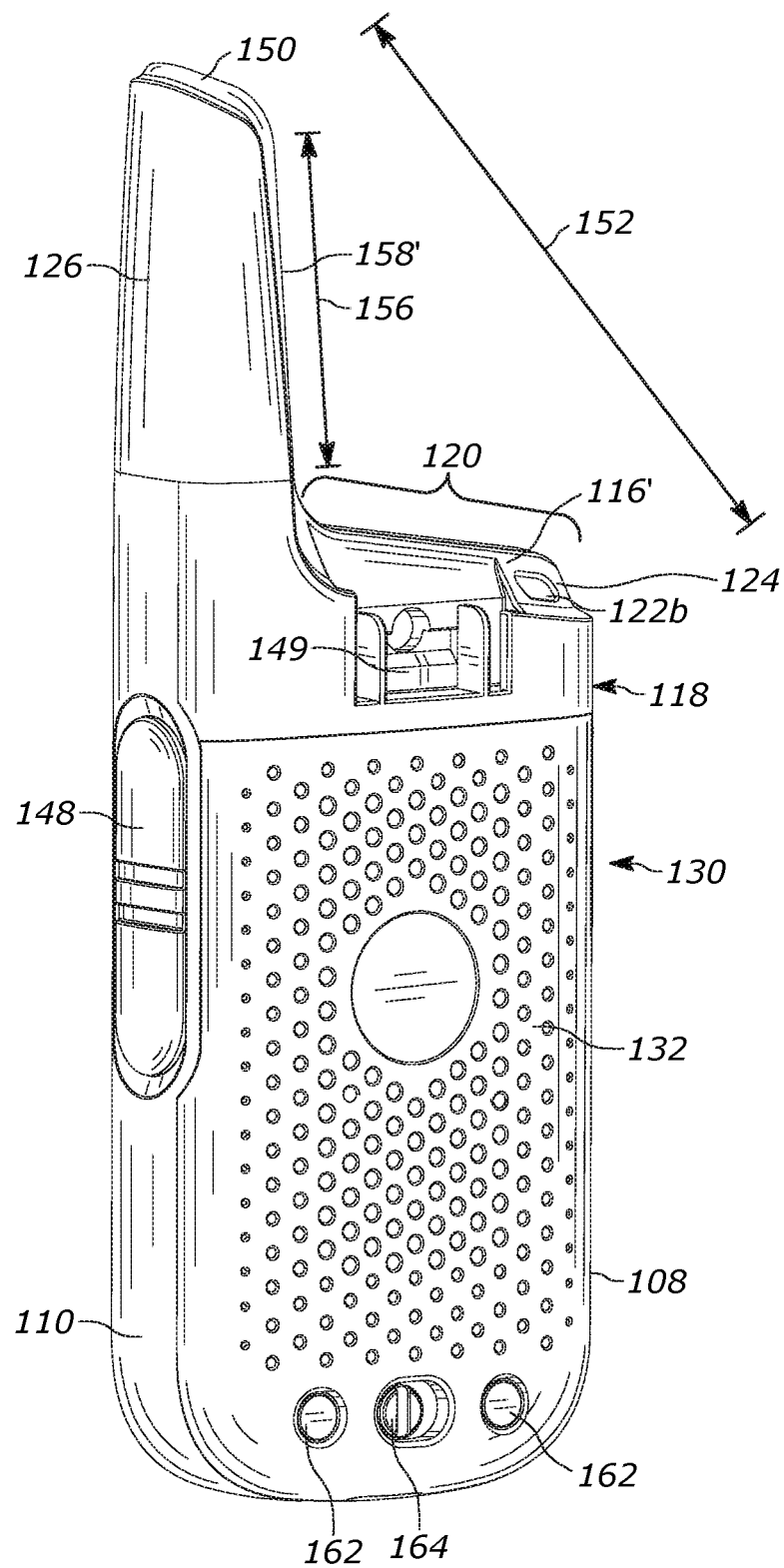
FIG. 2 is a back perspective view of the portable radio in accordance with the various embodiments.

FIG. 1 is a front perspective view of a portable radio 100 formed in accordance with the various embodiments. FIG. 2 is a back perspective view of the portable radio 100 in accordance with the various embodiments. FIGS. 1 and 2 show an assembled housing of portable radio 100, referred to as portable radio housing 102. The portable radio housing 102 is formed of a plurality of ruggedized plastic piece parts.

Referring to FIGS. 1 and 2, the portable radio 100 may be a portable two-way radio which may be used in a variety of communication environments, such as business, consumer retail, security and the like. Portable radio 100 comprises electronics such as controller, transmitter and receiver (not shown), for transmitting and receiving communication signals, such as radio frequency (RF) signals, audio signals, data signals, and the like.

Referring to FIG. 1, in accordance with the various embodiments, the portable radio housing 102 comprises a front housing portion 104 having a front surface 106, first and second side surfaces 108, 110, a bottom surface 112, and a top surface 114, the top surface has a flat planar portion having offset tapered edges 116 relative to the front surface and the first and second side surfaces.

Referring to FIG. 2, the portable radio housing 102 further comprises a rear housing portion 118 coupled to the front housing portion 104, the rear housing portion having a top contoured edge 120 with corresponding offset tapered edges 116' which meet with the top surface 114.

In accordance with the various embodiments, and referring to FIGS. 1 and 2, the portable radio housing 102 further comprises a lanyard through-hole feature 122 located at a first end 124 of the top surface, the lanyard through-hole feature being formed though the front and rear housing portions 104, 118 through the offset tapered edges 116, 116'. The first end 124 of the top surface may also be referred to as the lanyard end.

In accordance with the various embodiments, the portable radio further comprises an antenna protective cover 126 for encasing an external antenna, the antenna protective cover being coupled to a second end 128 of the top surface 114 of the front housing portion 104.

Referring to FIGS. 1 and 2, the front surface 106 of the front housing portion 104 and the first and second side surfaces 108, 110 of the front housing portion comprise a plurality of user interface radio controls 134 disposed thereon, and the top surface of the front housing portion has no user interface radio controls.

Referring to FIG. 1, the plurality of user interface radio controls 134 comprises a push-to-talk (PTT) button 136 and a pairing button 138 located on the first side surface 108 of the front housing portion 104. A plurality of radio function keys 140, a display 142, a speaker grill 144 and a microphone 146 located on the front surface 106 of the front housing portion 104. Microphone 146 blends with the speaker grill.

Referring to FIG. 2, the plurality of user interface radio controls 134 further comprises a USB port and audio accessory interconnect port (shown in later views) covered by a dust cover 148 located on the second side surface 110 of the front housing portion 104.

The rear housing portion 118 comprises an attachment feature 149 for a belt clip (not shown) integrated therein and further accommodates a battery door 130. The battery door 130 is a removable batter door which comprises charging pins 162 and a battery door latch 164. The battery door 130 is removably coupled to the rear housing portion 118 via the battery door latch 164. A non-slip surface 132 is disposed on the battery door.

Hence, all of the plurality of user interface radio controls 134 have been located on the front housing portion 104 on the front surface 106 and first and second side surfaces 108, 110 without any being placed on the top surface 114 of the front housing portion.

The top surface 114 of the front housing portion 104 is contoured with the offset tapered edges 116 without any user interface radio controls to provide an improved surface that beneficially prevents radio controls from interfering with the user's body when the device is worn close to the body. The offset tapered edges 116 also provide an improved ruggedness protection against drop.

In accordance with the various embodiments, the offset tapered edges 116 of the top surface 114 of the front housing portion 104 form a reduced cross-section within which the lanyard through-hole feature 122 traverses with graduated diameter represented by a front aperture opening 122a and a back aperture opening 122b. The reduced cross section of the lanyard through-hole feature enables engagement of a plurality of different lanyard engagement devices.

The lanyard through-hole feature 122 and a top tip end 150 of the antenna protective cover 126 are located at opposite diagonal ends 152 from each other. The top tip end 150 of the antenna protective cover 126 is formed of an upward curved surface 154, sloped at a non-90 degree surface relative to top surface 114. The top tip end 150 of antenna protective cover 126 curves into a non-90 degree vertical length surface 156 toward second end 128 of top surface 114 providing reinforced stability to the antenna under drop conditions. The non-90 degree vertical length surface 156 of the antenna protective cover 126 has offset tapered edges 158, 158' which align respectively with the offset tapered edges 116, 116' of the top surface 114 of the front housing portion. 104. The antenna protective cover 126 is secured as will be described later and is non-removable.

The lanyard through-hole feature 122 is protected by a contoured sloping encasement surface 160 formed as part of the first end 124 of the top surface 114 of the front housing portion. 104. The top tip end 150 of the antenna protective cover 126 slopes upward relative to the top surface 114, and the contoured sloping encasement curve 160 slopes downward relative to the top surface 114. The alignment of the offset tapered edges 158, 158' of the antenna protective cover 126 with the offset tapered edges 116, 116' of the top surface along with the upward curved slope 154 of antenna tip 150 and the downward curved slope 160 encasing the lanyard through-hole feature 122 combine to provide a monoform smooth contour. The oppositely curved surfaces 154, 160 at diagonally opposite ends 152 provide protection against drop impact. The monoform smooth contour form factor beneficially provides protection of the radio under drop conditions by dispersing the impact and avoiding cracked antennas and elimination of broken user interface radio controls from the top surface. The form factor also prevents user's from fidgeting with the control knobs and the antenna as has occurred in past traditional (having top control knobs and removable antenna) form factors. The elimination of top surface control knobs and monoform form factor with the antenna also minimizes discomfort to the user when the device is worn on or tethered to an article of clothing.

The portable radio 100 operates as a handheld device, sized to fit into the palm of a user's hand and/or may further be carried via a lanyard (shown later) attached through the lanyard through-hole feature 122. The lanyard may be a cord or strap attachable to the lanyard through-hole feature 122 to allow the portable radio 100 to be tethered around the neck, shoulder, wrist and/or a body wearable garment. The lanyard through-hole feature 122 being located at the opposite diagonal end of the antenna encasement tip 150 enables tilting of the portable radio 100 at a non-vertical position when tethered to the neck, shoulder, wrist or body wearable garment. Tilting the portable radio 100 to a non-vertical angle minimizes discomfort to the user, by preventing the antenna from directly poking the user.

Figure 3:
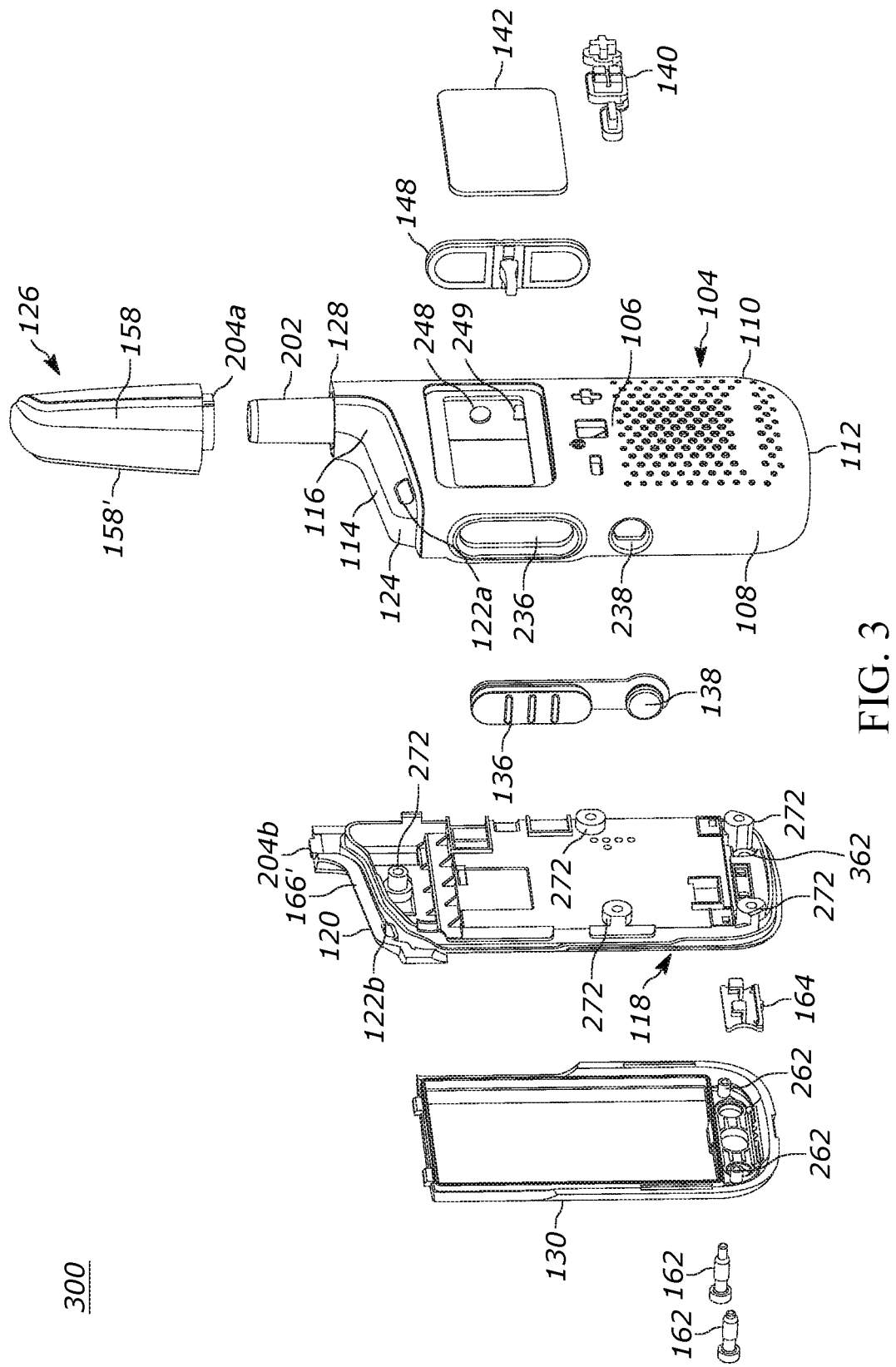
FIG. 3 is a front isometric exploded view of the portable in accordance with the various embodiments.
Figure 4:
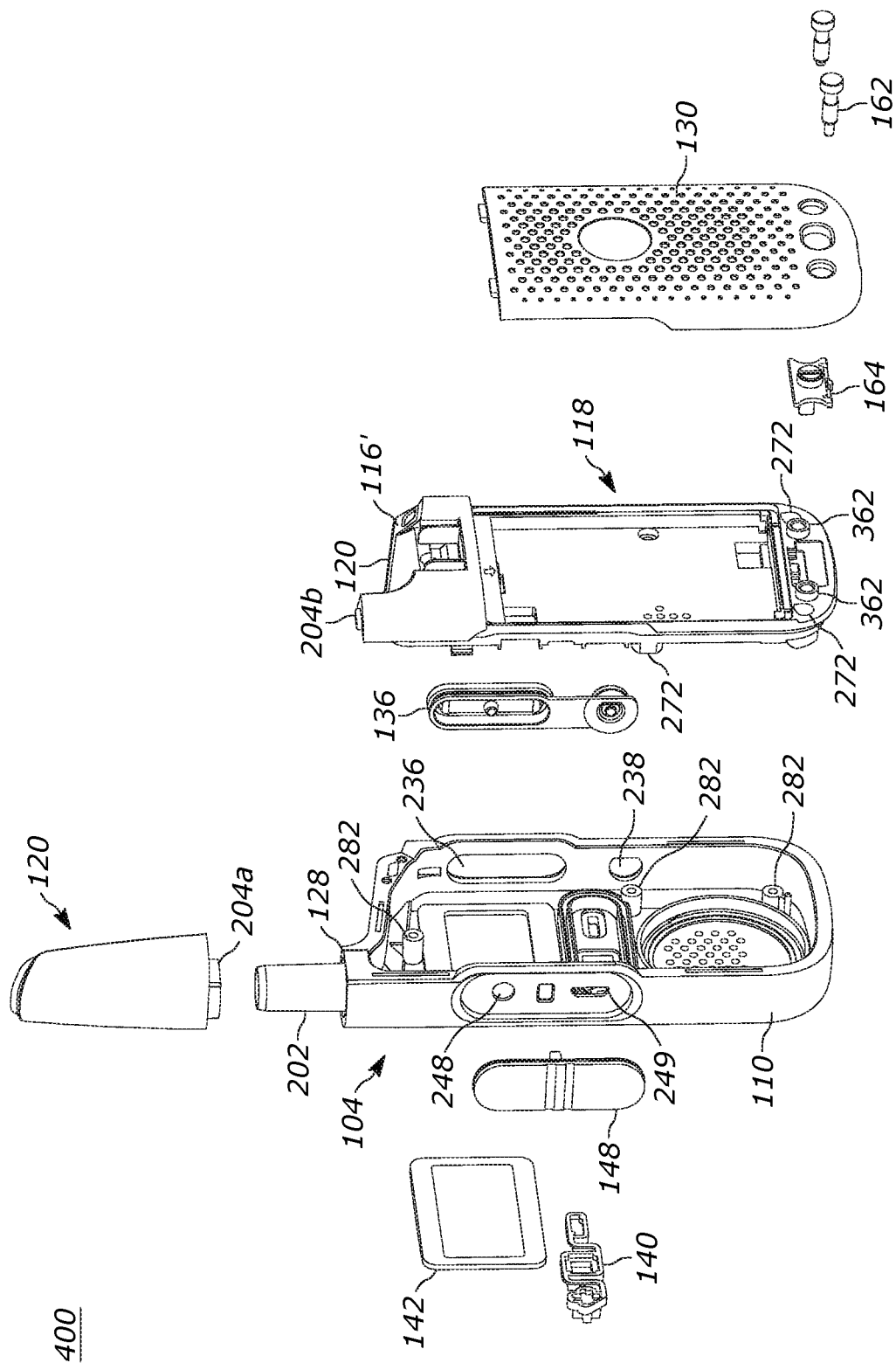
FIG. 4 is a back isometric exploded view of the portable radio in accordance with the various embodiments.

FIG. 3 is a front isometric exploded assembly view 300 of the portable radio housing 102 in accordance with the various embodiments. FIG. 4 is a back isometric exploded assembly view 400 of the portable radio housing 102 in accordance with the various embodiments. Referring to FIGS. 3 and 4, views 300 shows the front housing portion 104 having front surface 106, first and second side surfaces 108, 110, bottom surface 112, and top surface 114, the top surface having offset tapered edges 116 relative to the front surface and the first and second side surfaces. The rear housing portion 118 has a top contoured edge 120 for aligning and mating with the offset tapered edges 116 of the top surface 114 of front housing portion 104.

The PTT button 136 and pairing button 138 are formed from a single plastic piece part to which protrude through corresponding openings 236, 238 on the first side surface 108 of the front housing potion 104. The dust cover 148 covers accessory port opening 248 and USB port opening 249 on the second side surface 110 of the front housing portion 104. The display 142 and radio function keys 140 assemble to corresponding openings on the front surface 106 of the front housing portion 104.

In accordance with the various embodiments, the front and rear housing portions 104, 118 may be assembled together via screws (not shown) through a plurality of screw inserts 272 on the rear housing portion 118 and corresponding inserts 282 on the front housing portion 104. The battery door 130 comprises a plurality of openings for receiving the charging pins 162 and battery door latch 164. The battery door 130 comprises alignment ribs 262 which operate as guides that fit within the screw inserts 272 of the rear housing portion 118. The rear housing portion 118 comprises charging pin inserts 362 for receiving charging pins 162. The battery door latch 164 secures the battery door 130 to the rear housing portion 118.

In accordance with the various embodiments, the lanyard through-hole feature 122 is formed of front aperture opening 122a and back aperture opening 122b of the front and rear housing portions 104, 118 respectively. The front aperture opening 122a traverses through the offset tapered edges 116 at the first end 124 of the top surface 114 to align and mate with the back aperture opening 122b of the rear housing portion 118. The graduated lanyard through-hole feature 122a, 122b minimizes slippage and facilitates retention of a lanyard.

In accordance with the various embodiments, the front housing portion 104 further comprises an antenna alignment tube 202 for receiving an antenna element (not shown). The antenna alignment tube 202 extends from the second end 128 of the top surface 114 of the front housing portion 104. In accordance with the various embodiments, the antenna protective cover 126 couples to the second end 128 of the top surface 114 of the front housing portion 104 thereby covering the antenna alignment tube 104 and providing protection to the tube and antenna element contained therein. Accordingly, the portable radio 100 formed of portable radio housing 102 with antenna protective cover 126 coupled thereto combine to protect an external antenna element by containing that element within the interior of the overall device. The antenna protective cover 126 may be snap fit over the antenna alignment tube 202 via an attachment interface, such as ribbed interconnects 204a, 204b, respectively located at the antenna protective cover 126 and rear housing portion 118. Once snap fit together, the antenna protective cover 126 is not removable from the combined front and rear housing portions 104, 118. The attachment interface thus prevents detachment of the antenna from the portable radio.

The antenna protective cover 126, when snap fit to second end 128 of the front housing portion 104, forms a vertical exterior side surface 166 that aligns and sits flush with the second side surface 110 of the front housing portion 104. The non-90 degree vertical length surface 156 of antenna protective cover 126 joins the second end 128 of top surface 114 wherein the offset tapered edges 158, 158' of the antenna protective cover 126 align and mate with the offset tapered edges 116, 116' of the front housing portion 104 and rear housing portion 118. The antenna protective cover 126 thus creates a monoform form factor with the top surface 114 and lanyard through-hole feature 122.

Figure 5:
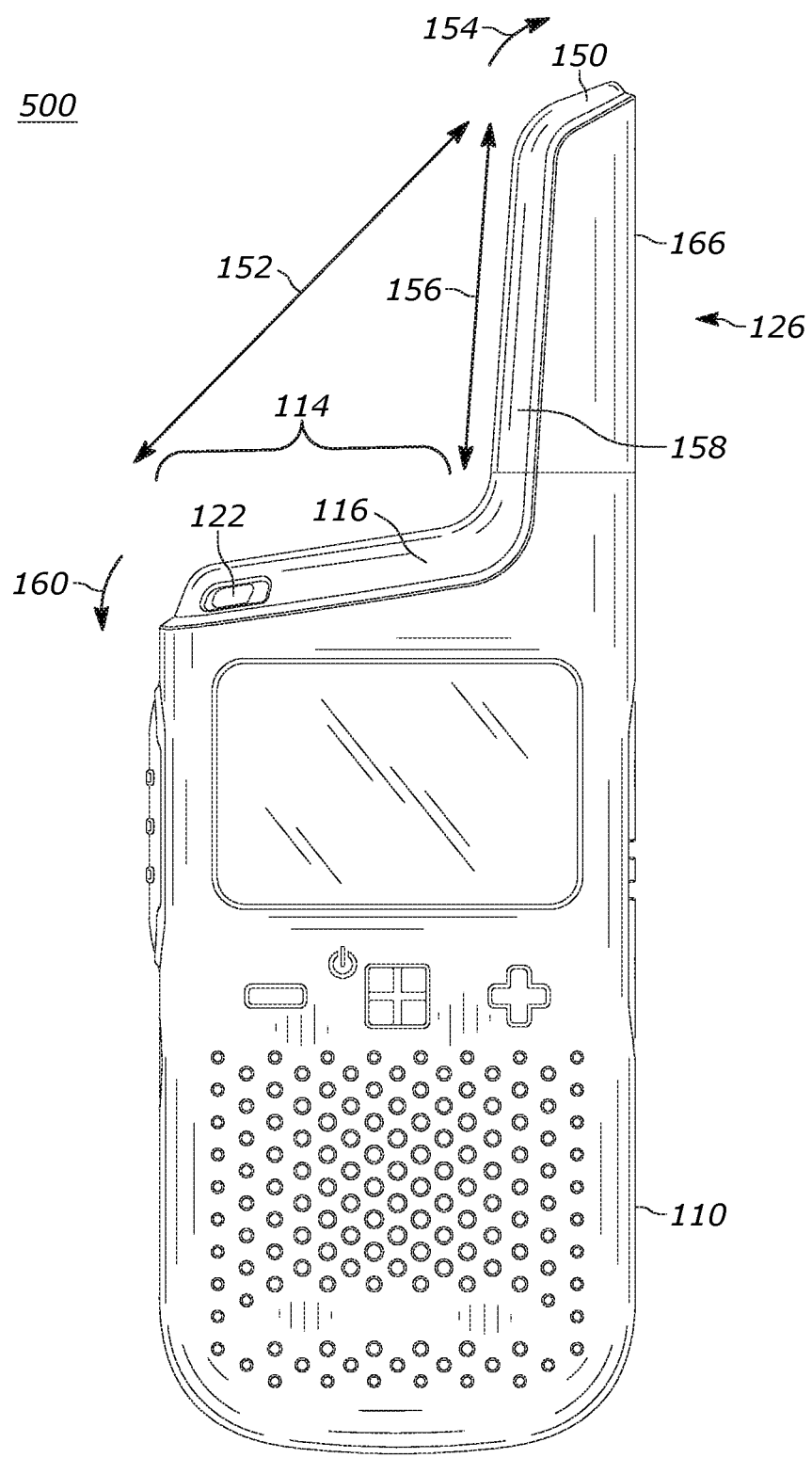
FIG. 5 is a front view of the portable radio in accordance with the various embodiments.

FIG. 5 is a front view 500 of the portable radio 100 in accordance with the various embodiments. The antenna protective cover 126 comprises a straight vertical exterior side surface 166 which sits flush with the second side surface 110 of the front housing portion 104, thereby forming a monoform smooth linear surface with the overall device. The antenna protective cover 126 provides a sloped interior surface 156 joining the top surface 114 of the front housing portion 104. The top tip end 150 of the antenna protective cover 126 and the lanyard through-hole feature 122 are located at opposite diagonal ends 152 from each other. The lanyard through-hole feature 122 is protected by the contoured curved surface 160 of the top surface 114. The upward curved surface 154 of top tip end 150 of antenna protective cover 126 in conjunction with the downward curved surface 160 at the lanyard through-hole feature 122, along with the tapered offset edges 116, 158 and 116', 158' aligned along the top surface 114 and antenna protective cover 126 provide improved drop impact resistance, through the avoidance of sharp angled corners and edges.

Figure 6:
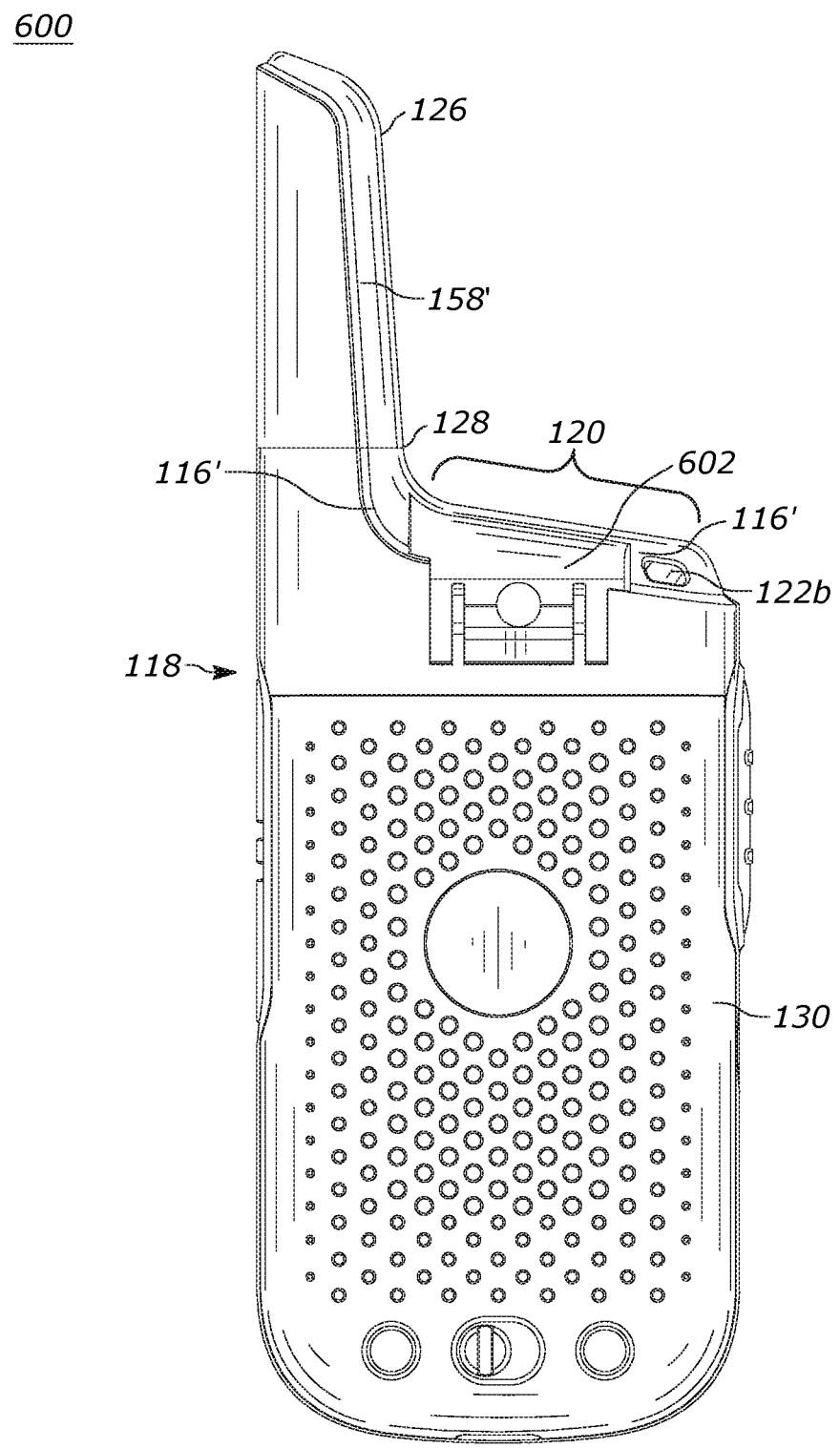
FIG. 6 is a back view of the portable radio in accordance with the various embodiments.

FIG. 6 is a rear view 600 of the portable radio in accordance with the various embodiments. Battery door 130 is shown attached to rear housing portion 118. The rear housing portion comprises belt clip attachment feature 149 formed of slot-in latch for receiving a belt clip (not shown). The rear housing portion 118 has a recessed surface area 602 that provides spacing for insertion and release of a belt clip. This view shows tapered offset edges 158' of the antenna protective cover 126 aligned with tapered offset edges 116' of the rear housing portion 118 which form part of top contoured edge 120 of top surface 114. The lanyard through-hole feature 122 has a smaller opening 122b on the rear housing portion 118 than on the front housing portion.

Figure 7:
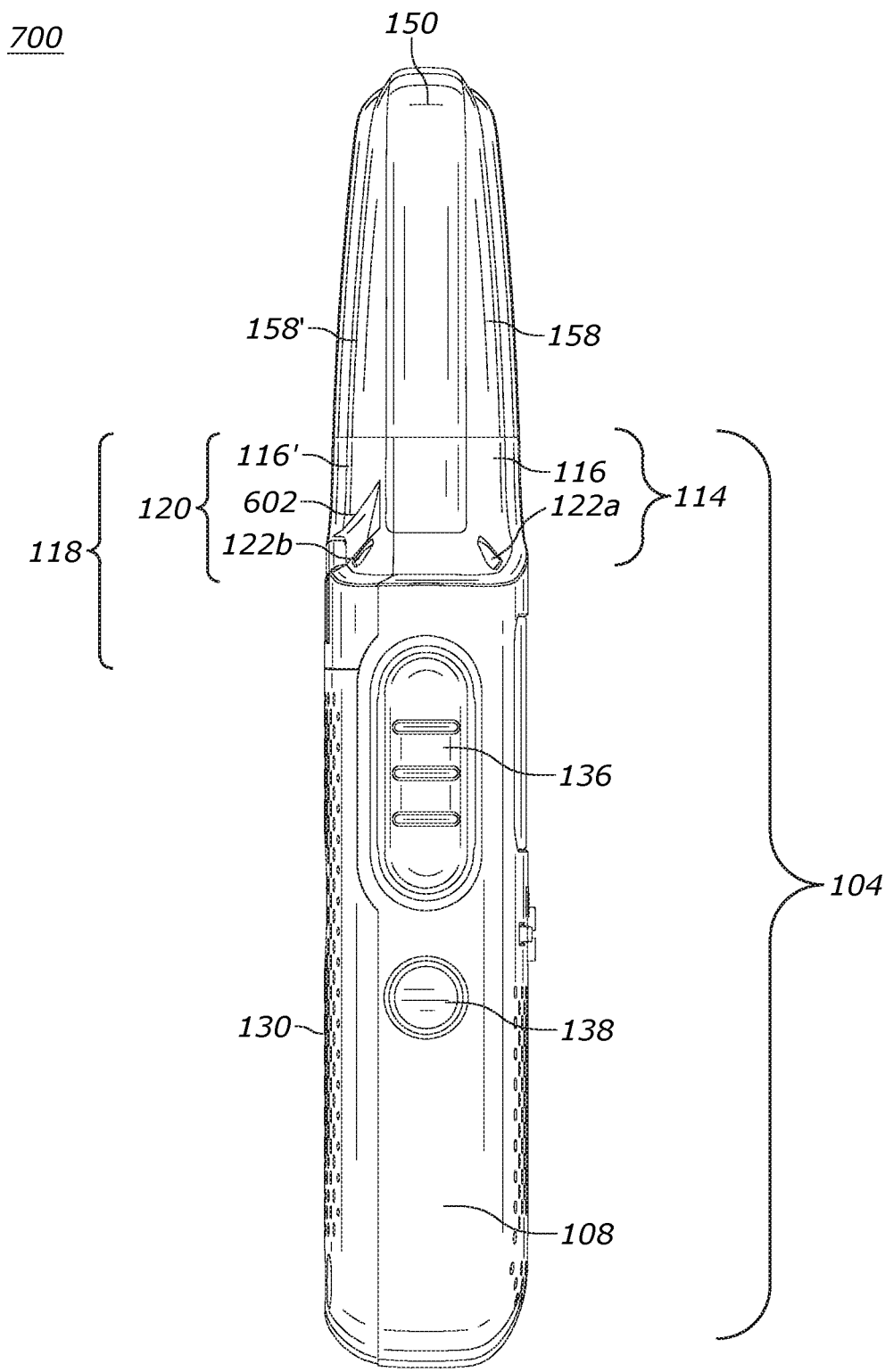
FIG. 7 is a first side view of the portable radio in accordance with the various embodiments.

FIG. 7 is a first side view 700 of the portable radio 100 in accordance with the various embodiments. This view shows the first side surface 108 of the portable radio 100 with antenna protective cover 126 extending therefrom. The PTT button 136 and pairing button 138 are shown on the first side surface 108. The front aperture opening 122a of the lanyard through-hole feature 122 is larger on the front housing portion 104 of the radio than the opening 122b on the rear housing portion 118 of the radio. The top contoured edge 120 of rear housing portion 118 comprises the tapered offset edge 116', recessed surface area 602, and back lanyard opening 122b. The top contoured edge 120 aligns with and becomes part of the top surface 114 of the portable radio. View 700 clearly shows the tapered offset edges 158, 158' of the antenna protective cover 126 aligned with corresponding tapered offset edges 116, 116' of front and rear housing portions 104, 118 respectively. The recessed surface area 602 of rear housing portion 118 provides spacing for insertion and release of a belt clip though the latch. View 700 shows the interior side of the antenna protective cover 126 forming the advantageous monoform smooth surface with the top surface of the portable radio housing 102.

Figure 8:
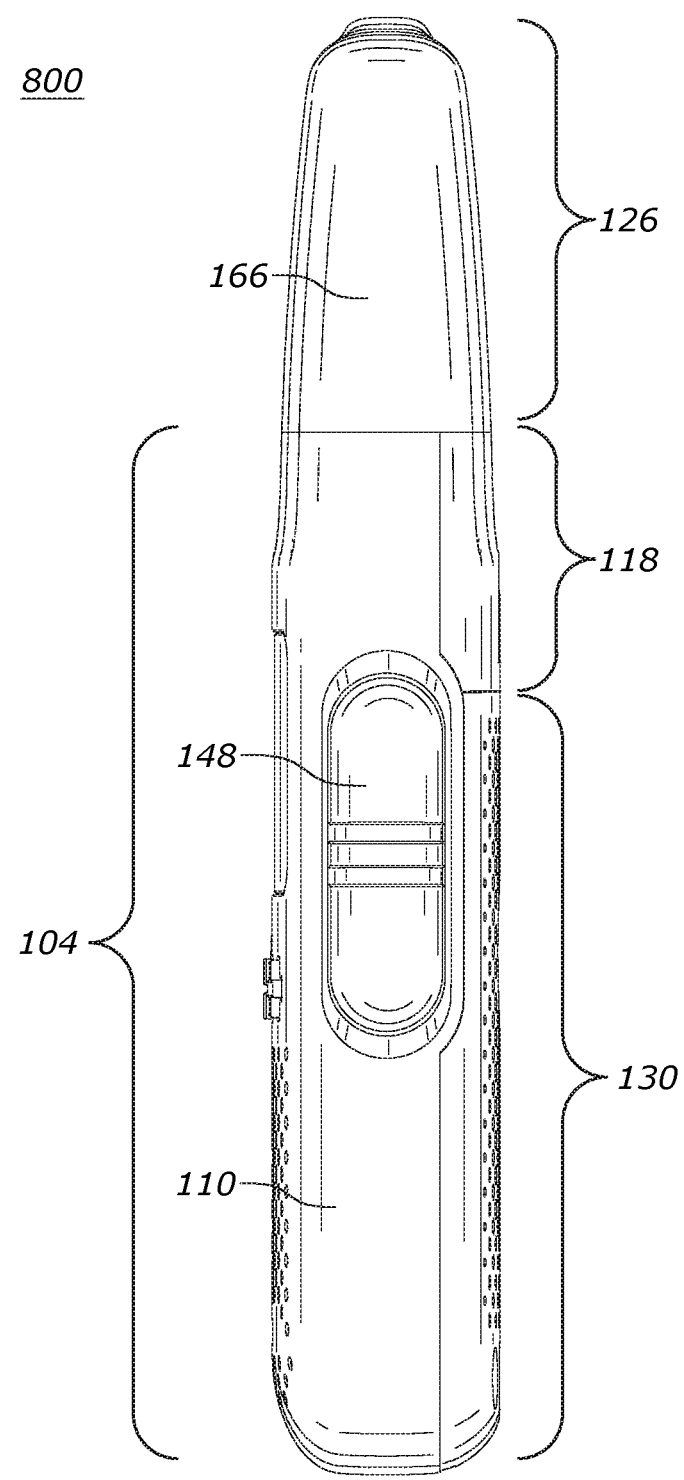
FIG. 8 is a second side view of the portable radio in accordance with the various embodiments.

FIG. 8 is a second side view 800 of the portable radio 100 in accordance with the various embodiments. This view shows the demarcations for the front housing portion 104, the rear housing portion 118, the antenna protective cover 126, the battery door 130. This view shows the dust cover 148 which shields the radio control functions comprising the USB and accessory porting shown in the exploded views. The antenna protective cover 126 provides a straight, smooth, vertical alignment via vertical exterior side surface 166 which sits flush with the second side surface 110 of the front housing portion 104 accentuating the monoform form actor. This form factor is particularly advantageous against breakage and snapping off of antennas.

Figure 9:
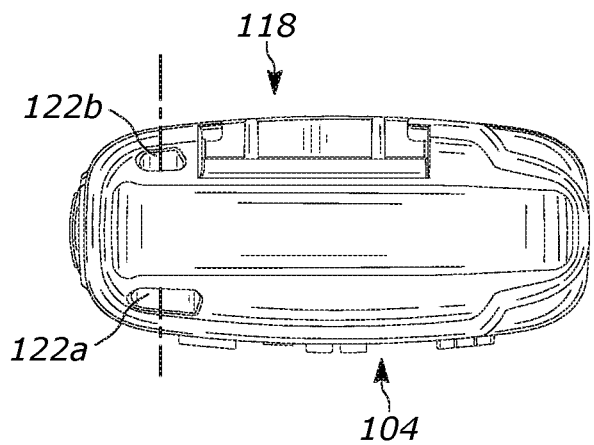
FIG. 9 is top view of the portable radio in accordance with the various embodiments.

FIG. 9 is a top view 900 of the portable radio 100 in accordance with the various embodiments. This view clearly shows the lanyard through-hole feature 122a, 122b having a graduated through-hole diameter traversing from a front housing portion 104 through to the rear housing portion 118. The graduated lanyard through-hole feature 122a, 122b prevents slipping of a lanyard and the location being diagonally opposed of the antenna facilitates tilting of the device when tethered, such tilting minimizes poking of the antenna when the portable radio is worn on the body.

Figure 10:
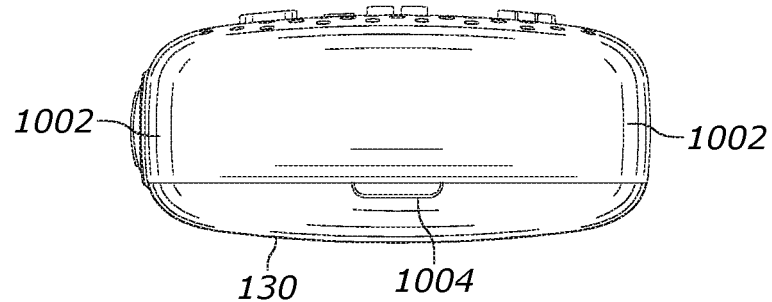
FIG. 10 is a bottom view of the portable radio in accordance with the various embodiments.

FIG. 10 is a bottom view of the portable radio in accordance with the various embodiments. Rounded bottom edges 1002 further facilitate the minimization of size for a device that can advantageously fit in the palm of a user's hand and minimize impact upon drop. A cut-out 1004 within the battery door 130 provides a space for finger insertion to facilitate removal of the battery door.

Figure 11:
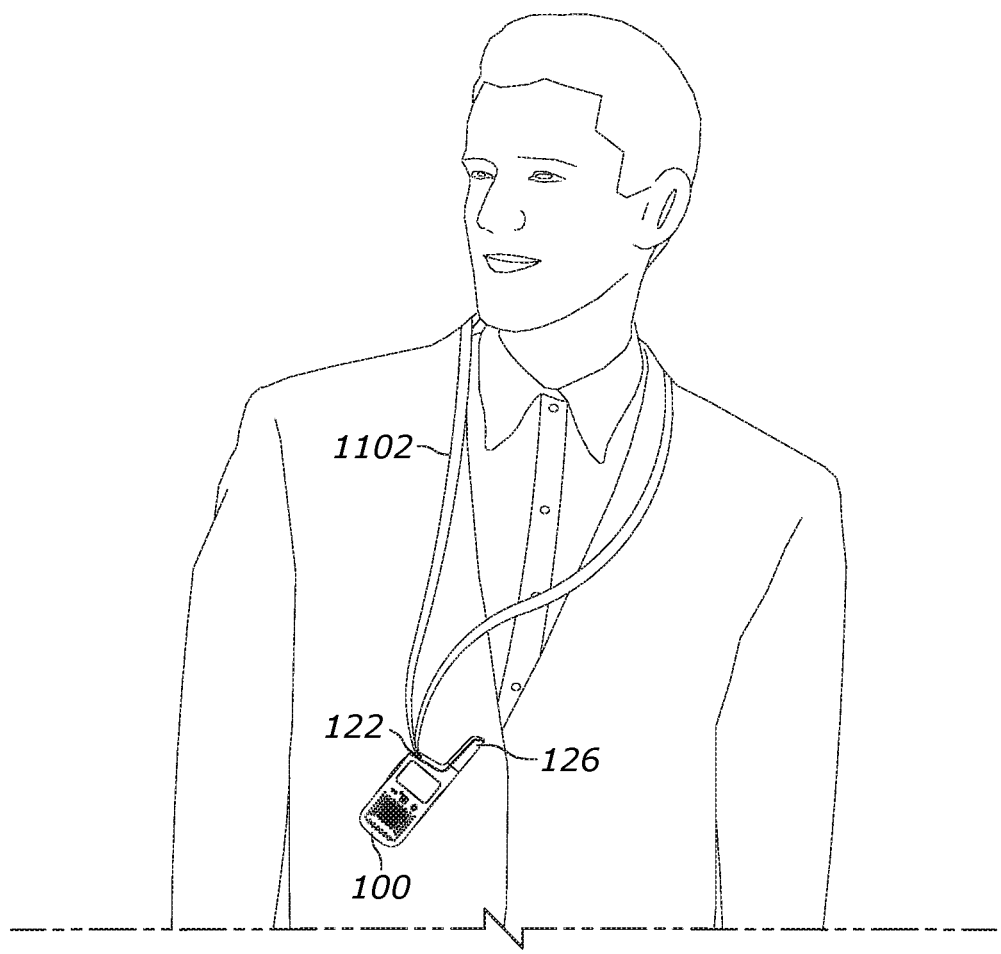
FIG. 11 shows an example of the portable radio being tethered by a lanyard in accordance with the various embodiments.

FIG. 11 shows an example of the portable radio 100 being tethered by a lanyard 1102 in accordance with some embodiments. The portable radio 100 is proportioned to fit within the palm of a user's hand thereby providing for a light, compact, yet ruggedized device. Again, the lanyard through-hole feature 122 being located at the opposite diagonal end of the antenna protective cover 126 enables tilting of the portable radio 100 at a non-vertical angle when tethered to the neck, shoulder, wrist or body wearable galinent. Tilting the portable radio 100 to a non-vertical position minimizes discomfort to the user by rotating the antenna away from the user's body thereby preventing the antenna from directly poking the user. The reduced cross section of the lanyard through-hole feature openings 122*a*, 122*b* advantageously enables engagement of a plurality of different lanyard engagement devices and prevents slippage of the device on the lanyard.

The monoform smooth contour form factor of the portable radio housing provided by the various embodiments beneficially provides protection of the radio under drop conditions by dispersing the impact and avoiding cracked antennas and broken user interface radio controls. The elimination of top surface control knobs and provision for a non-removable antenna protective cover 126 prevent users from fidgeting with the control knobs and the antenna as has occurred in past traditional (top control knobs and removable antenna) form factors. The elimination of top surface control knobs also minimizes discomfort to the user.

The portable radio formed in accordance with the various embodiments may incorporate a variety of diverse operating features, such as for example LTE, narrowband, Bluetooth, WLAN to name a few. The embodiments have provided for two-way portable radio having a slim profile, advantageously unencumbered by top surface control knobs.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A portable radio, comprising:
    a portable radio housing, comprising:
        a front housing portion having a front surface, first and second side surfaces, a bottom surface, and a top surface, the top surface having offset tapered edges relative to the front surface and the first and second side surfaces;
        a rear housing portion coupled to the front housing portion, the rear housing portion having a top contoured edge aligning and mating with the offset tapered edges of the top surface;
        a lanyard through-hole feature located at a first end of the top surface, the lanyard through-hole feature formed though the front and rear housing portions through the offset tapered edges;
    an antenna protective cover for an external antenna, the antenna protective cover being coupled to a second end of the top surface of the front housing portion; and
    a battery door coupled to the rear housing portion.

2. The portable radio of claim 1, wherein the front surface of the front housing portion and the first and second side surfaces of the front housing portion comprise a plurality of user interface radio controls disposed thereon, and the top surface of the front housing portion has no user interface radio controls.

3. The portable radio of claim 1, wherein the lanyard through-hole feature enables tilting of the portable radio housing at a non-vertical angle thereby rotating the external antenna to a non-vertical position when the portable radio is tethered to an article of clothing.

4. The portable radio of claim 1, wherein the antenna protective cover sits flush with the second side surface of the portable radio front housing portion.

5. The portable radio of claim 1, wherein the front housing portion further comprises:
    an antenna alignment tube extending from the second end of the top surface of the front housing portion, and wherein the antenna protective cover is snap fit over the antenna alignment tube.

6. The portable radio of claim 1, wherein the antenna protective cover forms a monoform form factor with the portable radio housing.

7. The portable radio of claim 1, wherein the antenna protective cover comprises a sloped top tip end.

8. The portable radio of claim 1, wherein the lanyard through-hole feature has a graduated through-hole diameter.

9. The portable radio of claim 1, further comprising:
    a belt-clip attachment feature integrated in the rear housing portion.

10. The portable radio of claim 1, further comprising:
    a non-slip surface disposed on the battery door.

11. The portable radio of claim 1, further comprising a push-to-talk (PTT) button on the first side surface of the front housing portion.

12. The portable radio of claim 1, wherein the antenna protective cover comprises a sloped top tip end, and the top surface of the front housing portion is sloped at the first end in an opposite direction.

13. The portable radio of claim 1, wherein the antenna protective cover is joined to the front housing portion of the portable radio housing via a ribbed attachment interface preventing detachment of the antenna protective cover.

14. The portable radio of claim 1, wherein the rear housing portion comprises an attachment feature for a belt clip, and wherein the rear housing portion has tapered offset edges with a recessed surface area for insertion and release of a belt clip.

15. The portable radio of claim 1, wherein the lanyard through-hole feature is located diagonally opposite a top tip end of the antenna protective cover.

16. The portable radio of claim 15, where the first end of the top surface having the lanyard through-hole feature is slopped, and the top tip end of the antenna protective cover is sloped in an opposite direction.

* * * * *